United States Patent
Dalla Palma et al.

(10) Patent No.: US 11,971,092 B2
(45) Date of Patent: Apr. 30, 2024

(54) HYDROMECHANICAL TRANSMISSION AND CONTROL METHOD

(71) Applicant: DANA ITALIA S.R.L., Trentino (IT)

(72) Inventors: Lorenzo Dalla Palma, Arco (IT); Fabio Gunsch, Arco (IT); Mario Gelmini, Arco (IT); Giovanni Profumo, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 17/653,856

(22) Filed: Mar. 7, 2022

(65) Prior Publication Data
US 2023/0279935 A1    Sep. 7, 2023

(51) Int. Cl.
*F16H 47/04* (2006.01)

(52) U.S. Cl.
CPC ....... *F16H 47/04* (2013.01); *F16H 2047/045* (2013.01); *F16H 2200/0039* (2013.01); *F16H 2200/0086* (2013.01)

(58) Field of Classification Search
CPC ............... F16H 47/04; F16H 2047/045; F16H 2200/0039; F16H 2200/0086
USPC .......................... 475/73, 72, 80, 814, 82, 83
See application file for complete search history.

(56) References Cited

U.S. PATENT DOCUMENTS

| | | | | |
|---|---|---|---|---|
| 5,156,577 A | * | 10/1992 | Fredriksen | F16H 47/04 475/74 |
| 6,190,280 B1 | * | 2/2001 | Horsch | F16H 37/042 475/209 |
| 7,361,111 B2 | * | 4/2008 | Aitzetmueller | F16H 47/04 74/330 |
| 7,530,914 B2 | | 5/2009 | Fabry et al. | |
| 8,469,850 B2 | * | 6/2013 | Stoeckl | B60K 6/442 475/72 |
| 8,806,864 B2 | * | 8/2014 | Ishii | F16H 47/04 60/487 |
| 8,808,131 B2 | * | 8/2014 | Seipold | F16H 47/04 475/219 |
| 9,714,500 B2 | * | 7/2017 | Kobiki | E02F 9/2292 |
| 10,427,670 B2 | * | 10/2019 | Vasudeva | F16H 61/421 |
| 2011/0021302 A1 | * | 1/2011 | Panizzolo | F16H 47/04 475/207 |

OTHER PUBLICATIONS

Gelmini, M. et al., "Hydraulic System and Piston Filling Control," U.S. Appl. No. 63/169,056, filed Mar. 31, 2021, 24 pages.

* cited by examiner

*Primary Examiner* — Roger L Pang
(74) *Attorney, Agent, or Firm* — McCoy Russell LLP

(57) ABSTRACT

Methods and systems for a hydromechanical transmission. In one example, the transmission system includes a hydrostatic assembly including a variable displacement hydraulic pump and a hydraulic motor and a planetary gearset coupled to a multi-speed gearbox, a hydraulic motor, and an output shaft via separate gears and shafts. In the system the variable displacement hydraulic pump is coupled to an input of the multi-speed gearbox, the multi-speed gearbox includes one or more clutches and is coupled to a prime mover and the output shaft is designed to couple to an axle.

17 Claims, 7 Drawing Sheets

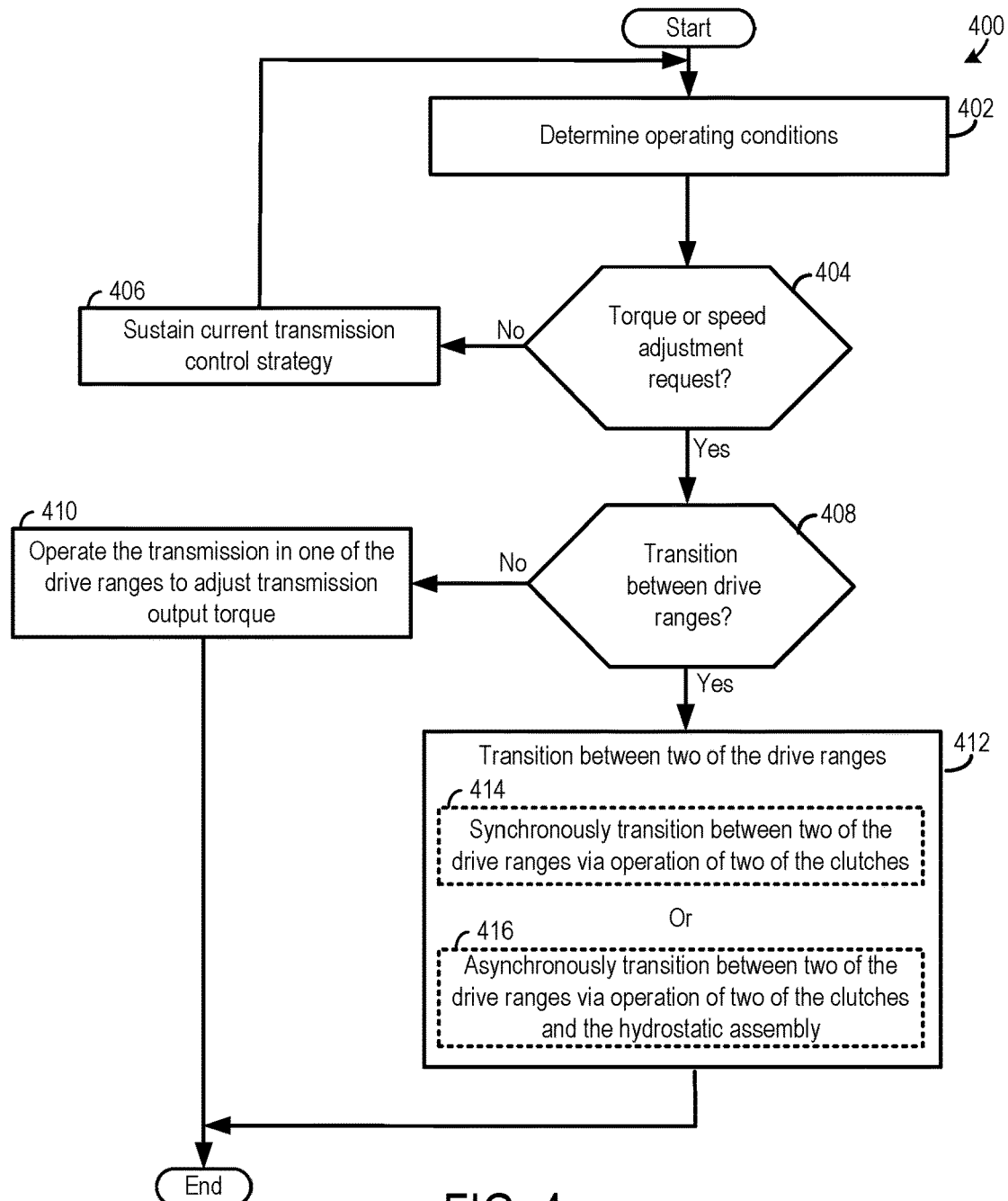

FIG. 4

| | Second Reverse Drive Range | First Reverse Drive Range | First Forward Drive Range | Second Forward Drive Range | Third Forward Drive Range |
|---|---|---|---|---|---|
| Clutch (108) | Engaged | Disengaged | Disengaged | Disengaged | Disengaged |
| Clutch (152) | Disengaged | Engaged | Engaged | Disengaged | Disengaged |
| Clutch (110) | Disengaged | Disengaged | Disengaged | Engaged | Disengaged |
| Clutch (126) | Disengaged | Disengaged | Disengaged | Disengaged | Engaged |

FIG. 1B

HYDROMECHANICAL TRANSMISSION AND CONTROL METHOD

TECHNICAL FIELD

The present disclosure relates to a hydromechanical transmission and a method for adjusting transmission drive range.

BACKGROUND AND SUMMARY

Hydromechanical transmissions enable performance characteristics such as efficiency, shift quality, drive characteristics, and control response, from mechanical and hydrostatic transmissions to be blended to meet vehicle design objectives. Some hydromechanical transmissions, referred to in the art as hydromechanical variable transmissions (HVTs), provide continuously variable gear ratios. Hydromechanical transmissions may be particularly desirable due to their efficiency. Vehicles used in industries such as agriculture, construction, mining, material handling, oil and gas, and the like have made use of HVTs.

U.S. Pat. No. 7,530,914 B2 to Fabry et al. teaches a hydromechanical transmission with two synchronizers and two clutches. The synchronizing devices and clutches work in conjunction to shift the transmission between high and low speed ranges in both forward and reverse operating modes. In Fabry's transmission, each clutch is paired with a synchronizing device on a common shaft. Further, each of the pairs of clutches and synchronizers are spaced away from one another due to the kinematic layout of the transmission assembly.

The inventors have recognized several drawbacks with Fabry's transmission as well as other hydromechanical transmissions. Fabry's synchronizers, for example, may be susceptible to degradation, which decreases transmission reliability. Furthermore, the synchronizers may increase the transmission's size and complexity. Further, the available drive ranges in Fabry's transmission may be undesirable in certain vehicle platforms. For example, a greater number of drive ranges may be desired certain vehicles. Specifically, some vehicle platforms may demand asymmetry with regard to the number of forward and reverse drive ranges to achieve performance targets. Other hydromechanical transmissions have made unwanted tradeoffs with regard to transmission complexity, packaging efficiency, operational drive ranges, and shifting smoothness.

To address at least a portion of the abovementioned issues, the inventors developed a transmission system. The transmission system includes a hydrostatic assembly with a variable displacement hydraulic pump and a hydraulic motor. The system further includes a planetary gearset coupled to a multi-speed gearbox, a hydraulic motor, and an output shaft via separate gears and shafts. Further, the multi-speed gearbox is coupled to a prime mover such as an engine and includes multiple clutches. Further, in the system, the output shaft is designed to couple to an axle and the variable displacement hydraulic pump is coupled to an input of the gearbox. In this way, the transmission achieves desired performance characteristics with regard to efficiency and drive range in a comparatively compact package. For instance, in one example, the transmission system is designed with at least two reverse drive ranges and three forward drive ranges. Thus, the system may have a greater number of forward drive ranges than reverse drive ranges, allowing the available drive ranges to match desired vehicle performance characteristics, if wanted. Customer appeal is consequently increased.

Further in one example, the clutches in the multi-speed gearbox are friction clutches and the gearbox may be designed to powershift between two of the drive ranges. In this way, interruptions in torque transfer during shifting transients may be significantly reduced and substantially avoided in some cases. The transmission performance with regard to efficiency may be increased while also decreasing noise, vibration, and harshness (NVH) during shifting when compared to transmissions that make use of other types of clutches such as dog clutches.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 1B shows a table which indicates the configuration of the clutches in the hydromechanical transmission, shown in FIG. 1A, in different drive ranges.

FIG. 4 shows a method for operation of a hydromechanical transmission system.

DETAILED DESCRIPTION

A hydromechanical transmission and method for operation of the transmission is provided herein. The hydromechanical transmission enables asynchronous shifting to occur between at least two of the transmission's drive ranges using an architecture than may achieve a comparatively high level of space efficiency and less complexity (e.g., especially with regard to the planetary gear set arrangement), in some cases, when compared to other transmissions that are solely configured for synchronous shifting operation. Designing the transmission with asynchronous shifting further enables more flexibility in the control of the gear shifting. For instance, the asynchronous shifting operation provides a larger shifting window when compared to synchronous shifting which may occur at a specific shift point. The transmission includes a hydrostatic assembly, a multi-speed gearbox with clutches, and a planetary gearset. The gearbox and the hydrostatic motor may be coupled to the planetary gearset. Arranging the transmission component in this manner enables the transmission to achieve a desired number of gear ranges (e.g., at least two reverse drive ranges and at least three forward drive ranges) as well as relatively space efficient package. The first hydrostatic drive range permits more precise transmission component positioning. Further, at least a portion of the transmission clutches may be placed on an input side of the gearbox to reduce clutch dimensions.

The shifting strategy employed in the system may include, asynchronously shifting between two drive ranges by inverting hydrostatic assembly speed during a shifting window. This hydrostatic assembly speed inversion may occur while torque is handed over between two of the clutches in the transmission's gearbox. This torque handover involves bringing one clutch into engagement while the other clutch is disengaged. Thus, the clutches are slipping and the transmission's output torque may be held substantially constant. In this way, an asynchronous shift may occur with little or no power interruption, if wanted. Consequently, noise, vibration, and harshness (NVH) during shifting transients may be reduced (e.g., avoided) and more generally shifting performance may be increased.

Figure 1A:
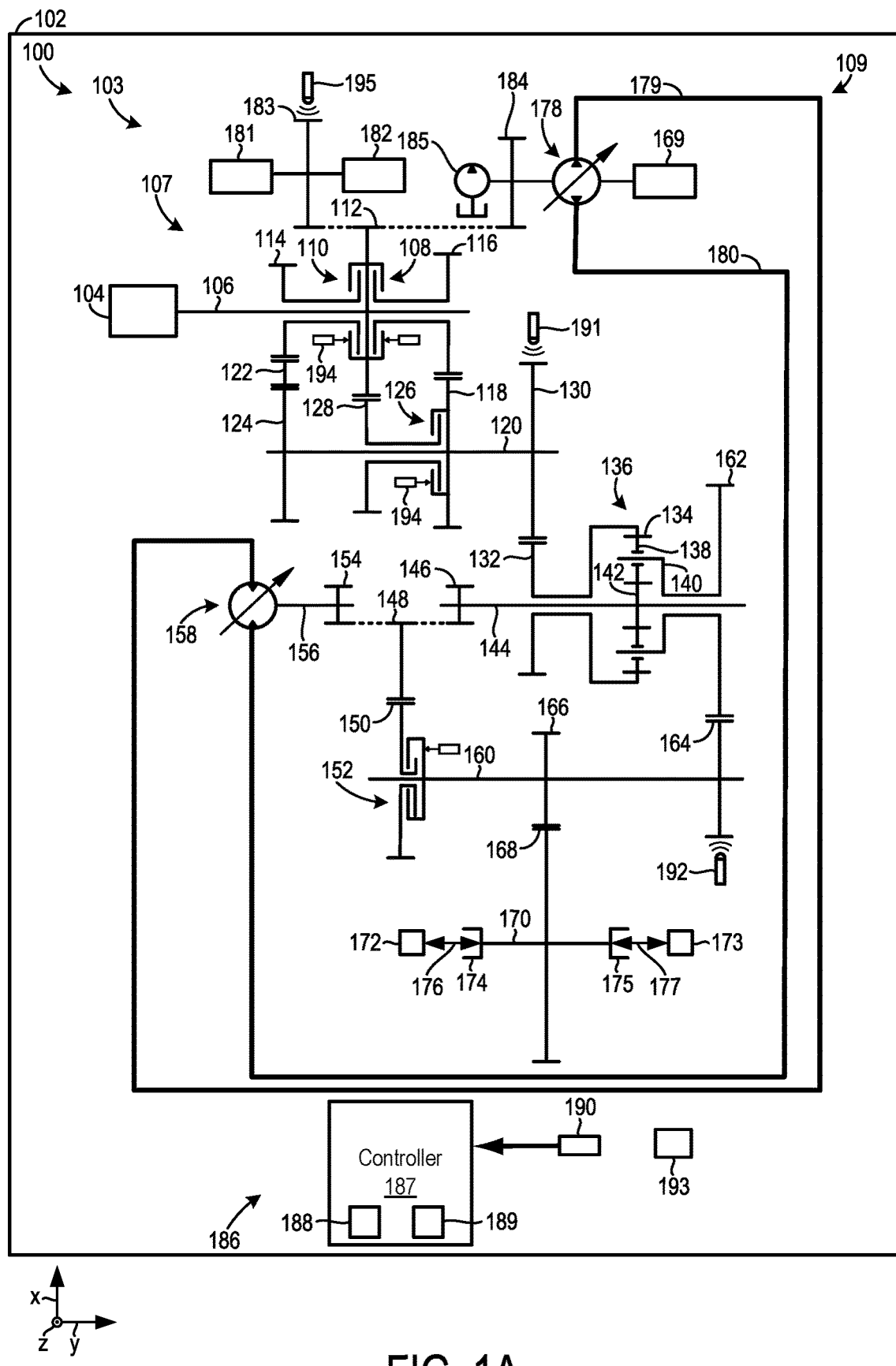
FIG. 1A shows a schematic representation of a vehicle with a hydromechanical transmission.

FIG. 1A shows a schematic depiction of a transmission system 100 (e.g., a hydromechanical variable transmission (HVT)) in a vehicle 102 or other suitable machine platform. It will be understood that the transmission system 100 includes a transmission 103. In one example, the vehicle may be an off-highway vehicle, although the transmission may be deployed in on-highway vehicles, in other examples. An off-highway vehicle may be a vehicle whose size and/or maximum speed precludes the vehicle from being operated on highways for extended durations. For instance, the vehicle's width may be greater than a highway lane and/or the vehicle top speed may be below the highway's minimum allowable or suggested speed, for example. Industries and their corresponding operating environments in which the vehicle may be deployed include construction, forestry, mining, agriculture, and the like. In either case, the vehicle may be designed with auxiliary systems driven via hydraulic and/or mechanical power take-offs (PTOs).

The transmission system 100 may function as an infinitely variable transmission (IVT) where the transmission's gear ratio is controlled continuously from a negative maximum speed to a positive maximum speed with an infinite number of ratio points. In this way, the transmission can achieve a comparatively high level of adaptability and efficiency in relation to transmissions which operate in discrete ratios.

The transmission system 100 may have asymmetric maximum output speeds for forward and reverse direction. This forward-reverse speed asymmetry may enable the transmission to achieve a desired breadth of speed ranges. However, other suitable output speed variations have been contemplated, such as symmetric output speeds in the forward and reverse directions, which may however, demand the use of one or more additional clutch(s) which may increase system complexity.

The transmission system 100 may include or receive power from a prime mover 104. The prime mover 104 may include an internal combustion engine, electric machine (e.g., electric motor-generator), combinations thereof, and the like.

Gears, such as bevel gears, may be used to rotationally couple the prime mover 104 to an input shaft 106. The input shaft 106 may be included in a multi-speed gearbox 107 along with the gears, clutches, other shafts, and the like described in greater detail herein. This gearbox may be conceptually included in a mechanical branch of the transmission that may be coupled with a hydrostatic assembly 109, in parallel.

As described herein a parallel attachment between components, assemblies, and the like denotes that the input and output of the two components or grouping of components are coupled (e.g., rotationally coupled) to one another such that power (e.g., mechanical power in the case of mechanical attachment) flow therebetween. This parallel arrangement allows power to recirculate through the hydrostatic assembly, during some conditions, or be additively combined from the mechanical branch and the hydrostatic branch, during other conditions. As a result, the transmission's adaptability is increased, which allows gains in operating efficiency to be realized, when compared to purely hydrostatic transmissions.

Further, as described herein, a gear may be a mechanical component which rotates and includes teeth that are profiled to mesh with teeth in one or more corresponding gears to form a mechanical connection that allows rotational energy transfer therethrough. Further, the input and output shaft of the transmission are described with regard to a drive mode where the prime mover 104 is transferring mechanical power to the transmission and in turn the transmission is transferring mechanical power to downstream component such as axles, drive wheels, and the like.

A reverse clutch 108 and a clutch 110. The clutch 110 may be associated with a second drive range, discussed in greater detail herein, and therefore may be referred to as a second drive range clutch. The clutches 108 and 110 as well as the other clutches described herein may be friction clutches (e.g., wet friction clutches) and therefore may include plates (e.g., friction plates and separator plates) that frictionally engage one another during clutch engagement. During partial engagement or disengagement these plates are allowed to slip, thereby allowing the torque transfer through the clutch to be selectively augmented. Further, the clutches described herein may be hydraulically and/or electro-mechanically actuated. For instance, the clutches may include pistons 194 that adjust clutch engagement/disengagement responsive to adjustment of hydraulic fluid pressure in a piston chamber. Valves (e.g., hydraulic control valves) that may be electronically controlled, such as via a solenoid, may be used to adjust the pressure supplied to the clutches hydraulic actuator (e.g., the piston assembly). The clutches may further include drums, separators, carriers, and the like.

The reverse clutch 108 and the clutch 110 be designed to selectively engage a gear 112 that is arranged on the input shaft. To elaborate, engagement of the clutch 110 may couple the gear 112 for rotation with a gear 114. Conversely, engagement of the reverse clutch 108 may couple the gear 112 for rotation with a gear 116.

The gear 116 may be coupled to a gear 118 that rotates with the shaft 120. On the other hand, the gear 114 may mesh with a gear 122 that meshes with a gear 124 which rotates with the shaft 120. As such, the gears 118 and 124 may be fixedly coupled or otherwise attached for rotation with the shaft 120. In this way, the reverse clutch and the reverse clutch may deliver torque to the shaft 120 in opposite directions. A clutch 126 is positioned coaxial to the shaft 120 and is designed to selectively engage the gear 118 and a gear 128 which is coupled to the gear 112. The clutch 126 may be associated with a third drive range, discussed in greater detail herein. As such, the clutch 126 may be referred to as a third drive range clutch.

A gear 130 that may be fixedly attached to the shaft 120 for rotation therewith may mesh with a gear 132. The gear 132 may be coupled via a shaft or suitable structure to a ring gear 134 in a planetary gearset 136. The planetary gearset 136 may be a simple planetary gearset, although more complex planetary assemblies may be used, in other examples. As such, the planetary gearset 136 may include planet gears 138 that rotate on a carrier 140 and a sun gear 142.

The sun gear 142 may be fixedly coupled to a shaft 144 for rotation therewith. A gear 146 may be fixedly coupled for rotation with the shaft 144. The gear 146 may be coupled to a gear 148. The mechanical connection between these gears is signified via a dotted line and may be established via suitable mechanical components such as shafts, joints, and the like. The gear 148 may mesh with a gear 150 that is coupled to a clutch 152. The clutch 152 may be associated with a first drive range and therefore may be referred to as a first drive range clutch. A gear 154 may be coupled to a mechanical interface 156 of a hydraulic motor 158. The clutch 152 is designed to selectively permit torque transfer from the gear 150 to an output shaft 160. A gear 162 coupled to the carrier 140 may mesh with another gear 164 on the output shaft 160. Yet another gear 166 on the output shaft 160 may mesh with a gear 168 on a shaft 170 that functions as a connection for downstream components such as drive axles 172, 173. To elaborate, mechanical interfaces 174, 175 (e.g., yokes, joints, and the like) may connect the shaft 170 to the drive axles 172, 173. Arrows 176, 177 denote the mechanical power transfer between the axles 172, 173 and the mechanical interfaces 174, 175. A driveline with a shaft, joints, and the like may be used to carry out the mechanical power transfer between the transmission and the axles. It will be understood that the drive axles 172, 173 may be coupled to drive wheels.

The hydraulic motor 158 is included in the hydrostatic assembly 109. The hydraulic motor may be an axial piston variable or a fixed motor such as a rotary type motor with an axial tapered piston and a bent-axis design, for instance. The hydrostatic assembly 109 may further include a variable displacement hydraulic pump 178 (e.g., variable displacement bi-directional pump). Further, the hydraulic pump 178 may be an axial piston pump, in one instance. To elaborate, the axial piston pump may include a swash plate that interacts with pistons and cylinders to alter the pump's displacement via a change in swivel angle, in one specific example. However, other suitable types of variable displacement bi-directional pumps have been contemplated.

The hydraulic motor 158 and the hydraulic pump 178 may be hydraulically coupled in parallel. Specifically, hydraulic lines 179, 180 are attached to hydraulic interfaces in each of the hydraulic motor 158 and the hydraulic pump 178 to enable the hydrostatic assembly to provide additive and power recirculation functionality with regard to a mechanical branch that is formed in the multi-speed gearbox 107 and coupled to (e.g., arranged in parallel with) the hydrostatic assembly 109. For example, in an additive power mode, power from both the hydrostatic and mechanical assemblies is combined at the planetary gearset 136 and delivered to the output shaft 160. Therefore, the hydraulic pump 178 and the hydraulic motor 158 may be operated to flow power to the planetary gearset 136. In a recirculating power mode, power is recirculated through the hydrostatic assembly 109 to the input of the multi-speed gearbox 107. Therefore, in the recirculating power mode, power flows from the hydrostatic assembly 109 to the gear 112.

The coupling of the hydrostatic assembly 109 to the multi-speed gearbox 107 enables the transmission to achieve power split functionality in which power may synchronously flow through either path to additively combine or recirculate power through the system. This power split arrangement enables the transmission's power flow to be highly adaptable to increase efficiency over a wide range of operating conditions. Thus, the transmission may be a full power split transmission, in one example.

A first mechanical PTO 181 and/or a second mechanical PTO 182 may be coupled to a gear 183. In turn, the gear 183 may be mechanically coupled to the gear 112. The mechanical PTOs 181, 182 may drive auxiliary systems such as a pump (e.g., a hydraulic pump, a pneumatic pump, and the like), a winch, a boom, a bed raising assembly, and the like. To accomplish the power transfer to auxiliary components, the mechanical PTOs may include an interface, shaft(s), housing, and the like. However, in other examples, the mechanical PTOs may be omitted from the transmission system 100. Another PTO 169 may be rotationally coupled to the hydraulic pump 178.

A gear 184 coupled to the gear 112 may be rotationally attached to a charging pump 185. The charging pump 185 may be designed to deliver pressurized fluid to hydraulic components in the transmission such as the hydraulic motor 158, the hydraulic pump 178, and the like. The fluid pressurized by the charging pump 185 may additionally be used for clutch actuation and/or transmission lubrication. The charging pump 185 may include a piston, a rotor, a housing, chamber(s), and the like to allow the pump to move fluid.

A control system 186 with a controller 187 (e.g., transmission control unit (TCU), vehicle electronic control unit (ECU), combinations thereof, and the like) may further be incorporated in the transmission system 100. The controller 187 includes a processor 188 and memory 189. The memory 189 may hold instructions stored therein that when executed by the processor cause the controller 187 to perform the various methods, control strategies, etc., described herein. The processor 188 may include a microprocessor unit and/or other types of circuits. The memory 189 may include known data storage mediums such as random access memory, read only memory, keep alive memory, combinations thereof, and the like.

The controller 187 may receive vehicle data and/or various signals from sensors positioned in different locations in the transmission system 100 and/or the vehicle 102. The sensors may include gear speed sensors 191, 192, 195 which detect the speed of gear 130, gear 164, and gear 183, respectively. In this way, gear speed at the input and the output of the system may be detected along with the gear speed at the input of the planetary gearset 136. However, in other examples, the speeds of at least a portion of the gears may be modeled by the controller.

The controller 187 may send control signals to an actuator in the hydraulic pump 178 or an actuation system coupled to the pump to adjust the pumps output and/or direction of hydraulic fluid flow. Specifically, the controller may send signals to the pump to adjust its swash plate angle. Additionally, the clutches 108, 110, 126, 152 may receive commands (e.g., opening or closing commands) from the controller and actuators in the clutches or actuation systems coupled to the clutches may adjust the state of the clutch in response to receiving the command. For instance, the clutches may be actuated via valves and hydraulically controlled pistons 194 that are included in a hydraulic control system 193, although other suitable clutch actuations systems have been envisioned such as electromechanical actuation systems and/or pneumatic actuation systems. The hydraulic control system 193 may include valves such as solenoid actuated valves that adjust the flow of hydraulic fluid supplied to the clutches (e.g., the control pistons) for actuation. The hydraulic control system may further include hydraulic lines and a pump, in one example. Alternatively, the charging pump 185 may supply pressurized hydraulic fluid (e.g., oil) to the hydraulic control system or be included therein.

The other controllable components in the transmissions system include the hydraulic pump 178, the hydraulic motor 158, the prime mover 104, and the like. These controllable components may function similarly with regard to receiving control commands and adjusting an output and/or a state of a component responsive to receiving the command via an actuator. Additionally or alternatively, an ECU may be provided in the vehicle to control the power source (e.g., engine and/or motor). Furthermore, the control system 186 and specifically the controller 187 with the memory 189 and processor 188 may be configured to carry out the shifting methods elaborated upon herein with regard to FIGS. 4-9.

The transmission system 100 may include an input device 190 (e.g., an accelerator pedal, a control-stick, levers, buttons, combinations thereof, and the like). The input device 190, responsive to driver input, may generate a transmission speed or torque adjustment request and a desired drive direction (a forward or reverse drive direction). Further, the transmission system may automatically switch between drive modes when demanded. To elaborate, the operator may request a forward or reverse drive mode speed or torque change, and the transmission may increase speed or torque and automatically transition between the drive ranges associated with the different drive modes, when desired (e.g., when the transmission approaches a desired shift point). Further, in one example, the operate may request reverse drive operation while the vehicle is operating in a forward drive mode. In such an example, the transmission may automatically initiate a transition between the forward and reverse drive modes. In this way, the operator may more efficiently control the vehicle. It will further be appreciated that the prime mover 104 may be controlled in tandem with the transmission 103. For instance, when a speed or torque adjustment request is received by the controller, the prime mover's output speed or torque may be correspondingly increased.

The transmission system 100 may additionally include a lubrication system which may include a sump, as previously discussed. The lubrication system may further include conventional components for lubricating the gears and/or the clutches such as pumps, conduits, valves, and the like.

Figure 2:
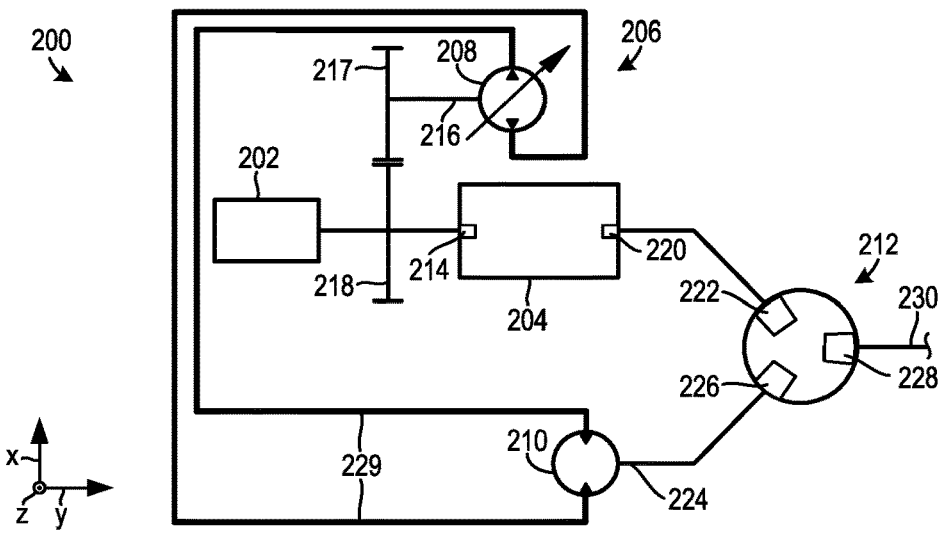
FIG. 2 shows a schematic representation of an example of a hydromechanical transmission system.
Figure 3A:
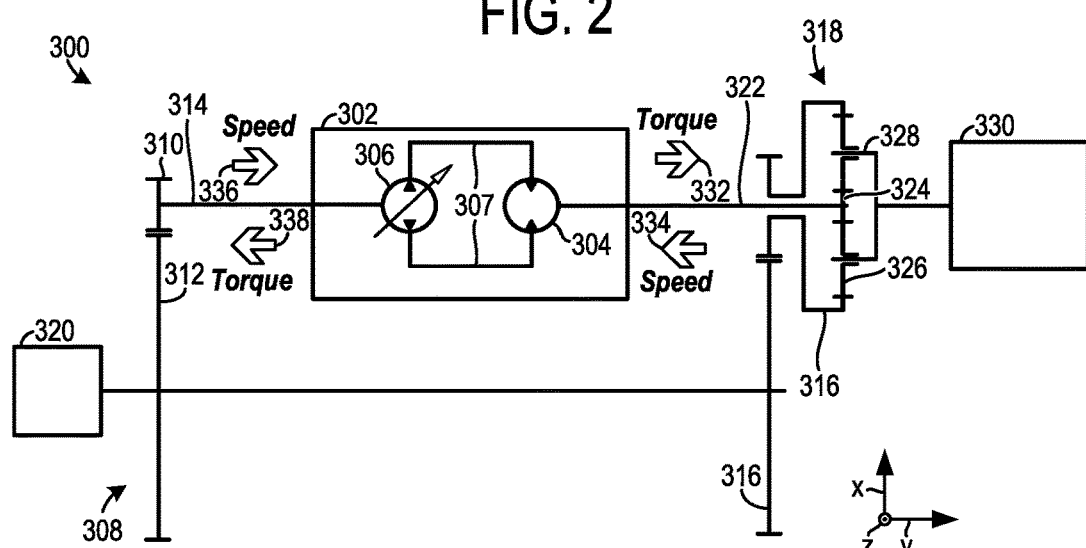
FIGS. 3A and 3B show torque and speed control modes in an example of a hydromechanical transmission system.
Figure 3B:
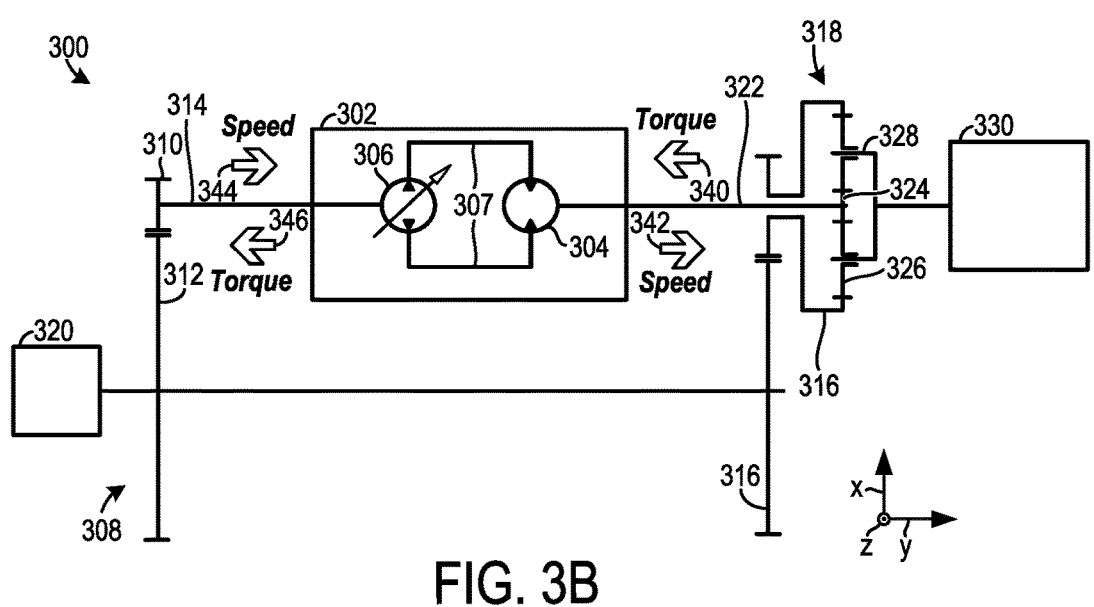

An axis system is provided in FIG. 1A, as well as FIGS. 2-3B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 1B shows a chart 199 that illustrates the configurations (engaged or disengaged) of the clutches 108, 110, 126, 152, shown in FIG. 1A in the different drive ranges (a second reverse drive range, a first reverse drive range, a first forward drive range, a second forward drive range, and a third forward drive range). The clutch 108 may be referred to as a reverse clutch, the clutch 152 may be referred to as a first drive range clutch, the clutch 110 may be referred to a second drive range clutch, and the clutch 126 may be referred to as a third drive range clutch. However, other clutch configurations may be used, in other embodiments.

In the second reverse drive range, the reverse clutch 108 is engaged while the clutches 110, 126, 152 are disengaged. Additionally, in the first reverse drive range, the clutch 152 is engaged while the clutches 108, 110, 126 are disengaged. In the first forward drive range, the clutch 152 is engaged while the clutches 108, 110, 126 are disengaged. In the second forward drive range, the clutch 110 is engaged while the clutches 108, 126, 152 are disengaged. Further, in the third forward drive range, the clutch 126 is engaged while the clutches 108, 110, 152 are disengaged. Shifting operation between these drive ranges is expanded upon herein with regard to FIGS. 4-9. The transmission system 100 may achieve forward and reverse directions by changing the motor speed direction that acts on the variable displacement hydraulic pump 178, shown in FIG. 1A, and can change the hydraulic fluid (e.g., oil) flow direction.

FIG. 2 shows a schematic depiction of a transmission system 200 with a higher level architecture than is depicted in FIG. 1A. However, in the transmission system 200 shown in FIG. 2, at least a portion of its components as well as the other transmission systems described herein (e.g., the transmission system 300, shown in FIGS. 3A and 3B) may have similar structure and/or functionality to components included in the transmission system 100, depicted in FIG. 1A. Redundant description is therefore omitted for brevity.

The transmission system 200 includes prime mover 202 (e.g., internal combustion engine and/or electric motor), a multi-speed gearbox 204, a hydrostatic assembly 206 with a hydraulic pump 208 and a hydraulic motor 210, and a planetary gearset 212 (e.g., a simple planetary gearset). The prime mover 202 is coupled to an input 214 of the multi-speed gearbox 204. It will be understood, that the gearbox input 214 serves as a mechanical input during drive operation. However, during other system modes, mechanical power may flow through this gearbox interface in the opposite direction. Further, a mechanical interface 216 (e.g., a shaft) of the hydraulic pump 208 is also coupled to the input 214 of the multi-speed gearbox 204. Gears 217, 218 that mesh with one another may allow this connection between the hydraulic pump 208 and the multi-speed gearbox 204, although other suitable mechanical connections have been contemplated.

An output interface 220 of the multi-speed gearbox 204 is coupled to a gear 222 (e.g., a ring gear) in the planetary gearset 212. A mechanical interface 224 (e.g., shaft) of the hydraulic motor 210 may be coupled to another gear 226 (e.g., a sun gear) in the planetary gearset 212. Yet another component 228 (e.g., a carrier) in the planetary gearset 212 may be coupled to a transmission output shaft 230. The hydraulic motor 210 and the hydraulic pump 208 in the hydrostatic assembly 206 are again hydraulically coupled in parallel via hydraulic lines 229.

FIGS. 3A and 3B show yet another schematic depiction of a transmission system 300. The transmission system 300 again includes a hydrostatic assembly 302 with a hydraulic motor 304 and a hydraulic pump 306 hydraulically coupled in parallel via lines 307. Further, a mechanical assembly 308 is mechanically coupled in parallel with the hydrostatic assembly 302. To elaborate, gears 310, 312 may serve to mechanically attach the mechanical assembly 308 to an interface 314 of the hydrostatic assembly 302 and a gear 316 may further serve to attach the mechanical assembly 308 to a gear 316 (e.g., a ring gear) of the planetary gearset 318.

An engine 320 or other suitable prime mover is coupled to the mechanical assembly 308 at one end, and a planetary gearset 318 is coupled to the mechanical assembly at the other end. Further, the hydrostatic assembly 302 may also couple to the planetary gearset 318 via a shaft 322 that is attached to a sun gear 324. The planetary gearset 318 further includes planet gears 326 which rotate on a carrier 328. The transmission system 300 is shown coupled to downstream components 330 such as axles, wheels, and the like.

Turning specifically to FIG. 3A, in the torque control mode, the hydraulic pump 306 is controlled to follow a hydraulic motor torque reference, referred to as a motor torque set-point. Due to the control of the hydraulic pump 306 using the motor torque reference in the torque control mode, the motor speed is consequently not controlled. Put another way, in the torque control mode, the control of the hydraulic pump may follow a motor torque reference and is not controlled using a motor speed reference. Arrows 332, 334 characterize the torque and speed conversion that occurs on the motor side of the hydrostatic assembly 302. Conversely, arrows 336, 338 characterize speed and torque conversion on the pump side of the hydrostatic assembly.

Turning to FIG. 3B, in the speed control mode, the hydraulic pump 306 is controlled to follow a hydraulic motor speed reference, referred to as a motor speed set-point. Due to the hydraulic pump 306 being controlled to follow motor speed reference, the motor torque as a consequence is not controlled. In other words, while in the speed control mode, the hydraulic pump is controlled according to a motor speed reference and control of the pump using a motor torque reference is negated. Arrows 340, 342 characterize the torque and speed conversion that occurs on the motor side of the hydrostatic assembly 302 and conversely, arrows 344, 346 characterize speed and torque conversion on the pump side of the hydrostatic assembly.

FIG. 4 shows a method 400 for operation of a transmission system. The method 400 and/or the other methods and control techniques described herein may be carried out by any of the transmissions and components described above with regard to FIGS. 1-3B or combinations thereof, in one example. However, in other examples, the method 400 and/or the other methods may be implemented using other suitable transmissions and corresponding components. Further, the method 400 and the other methods, control strategies, and the like may be carried out as instructions stored in non-transitory memory executed by a processor in a controller. As such, performing the method steps may include sending and/or receiving commands which trigger adjustment of associate components, as previously indicated.

At 402, the method includes determining operating conditions. The operating conditions may include transmission speed, transmission load, transmission torque, vehicle speed, operator torque request, operator speed request, prime mover speed, prime mover load, clutch positions, ambient temperature, transmission temperature, and the like. These operating conditions may be determined using sensor data and/or modeling algorithms.

At 404, the method includes determining if a torque or a speed adjustment request has been received. For example, a torque or a speed adjustment request may be generated in response to operator interaction with an input device such as an accelerator pedal, a control stick, a lever, and the like.

If a torque or speed adjustment request has not been received (NO at 404) the method proceeds to 406 where the method includes sustaining the current transmission control strategy. For instance, the transmission may be operated at a torque set-point, or a speed set-point in some cases, within one of the drive ranges.

If a torque or speed adjustment request has been received (YES at 404) the method advances to 408. At 408, the method judges whether or not to transition between drive ranges. The instructions in the transmission's controller may be designed to control the torque provided by the transmission to the output shaft. Therefore, the transmission's speed ratio may be a consequence of the torque applied by the transmission. For example, while the engine is operating at a substantially constant speed, if a higher pulling torque is applied by the transmission on the output shaft a higher output shaft acceleration and consequently a higher speed ratio gradient occur. The transmission's speed ratio may be altered as a consequence of an operator torque adjustment request. At a certain point of the acceleration, the transmission's speed ratio will approach a maximum value possible within the current operating drive range. As such, when the maximum speed value is approached, the operating drive range may be changed to prevent interruption of the pulling torque continuity to the wheel. For instance, the transmission may be transitioned from a second reverse drive range to the first reverse drive range, from a first forward drive range to a second forward drive range, or from a second forward drive range to a third forward drive range. The shifting strategies for these aforementioned drive ranges may be based on the two drive ranges involved in drive range transition.

If it is judged that a drive range transition should not occur or such a transition is not anticipated (NO at 408) the method advances to 410. At 410 the method includes operating the transmission in one of the drive ranges to adjust transmission output torque. As such, the configuration of the transmission clutches may remain unchanged in step 410.

Conversely, it is judged that a drive range transition should occur or such a transition is anticipated (YES at 408) the method advances to 412 where the method includes transitioning between two of the drive ranges. Step 412 may include at 414 synchronously transitioning between two of the drive ranges via operation of two of the clutches or at 416 asynchronously transitioning between two of the drive ranges via operation of two of the clutches and the hydrostatic assembly. The synchronous or asynchronous drive range transition may be implemented based on the drive ranges involved in the shifting event. For instance, step 416 may be implemented when the transmission is expected to transition between a second forward drive range and a third forward drive range or vice versa. On the other hand, step 414 may be implemented when the transmission is expected to transition between a first forward drive range and a second forward drive range or a first reverse drive range and a second reverse drive range. A synchronous shift event may involve engaging one clutch and releasing another when the hydrostatic ratio reaches a threshold (e.g., maximum) positive or negative value. Conversely, an asynchronous shift event may involve a number of phases which includes a phase where the hydrostatic assembly reverts its speed (e.g., fully swivels the pump to revert motor speed). The asynchronous shift may be a powershift where substantially constant power transfer through the driveline is guaranteed. Further, this asynchronous powershift event may be carried out while maintain a uni-directional power flow through the gearbox In other words, during the asynchronous shift, the power flow direction through the driveline may not invert. The asynchronous shifting strategy is discussed in greater detail herein with regard to FIGS. 5-9.

Figure 5:
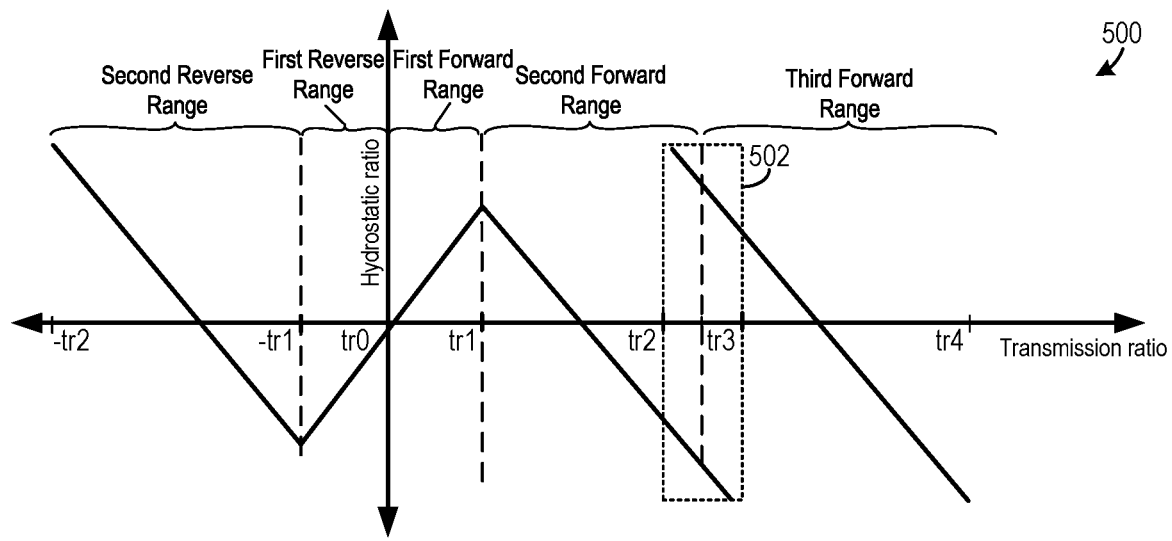
FIG. 5 shows a graphical depiction of a hydrostatic ratio vs. mechanical ratio in a hydromechanical transmission.

FIG. 5 shows a prophetic and exemplary graphical depiction 500 of the transmission system's hydrostatic ratio vs. mechanical ratio. Although specific values are not indicated on the abscissa or ordinate, points above the abscissa represent positive hydrostatic ratios and points below the abscissa represent negative hydrostatic ratios. Further, points to the left of the ordinate represent negative transmission ratios corresponding to reverse drive operation and points to the right of the ordinate represent positive transmission ratios corresponding to forward drive operation, increasing from left to right.

Specifically, the second reverse drive range occurs from −tr2 to −tr1 where the hydrostatic ratio decreases and turns negative part-way through the drive range. A transition from the second reverse drive range to the first reverse drive range may occur at a hydrostatic ratio inflection point (e.g., a minimum hydrostatic ratio). As such, at the inflection point, the hydrostatic assembly's power flow direction inverts. The first reverse drive range occurs from −tr1 to tr0 where the hydrostatic ratio increases. The transition between the first reverse drive range and the second reverse drive range occurs when the hydrostatic ratio turns positive. The first forward drive range occurs from tr0 to tr1 where the hydrostatic ratios continues to increase and specifically turns positive at tr0. The second forward drive range occurs from tr1 to tr2 where the hydrostatic ratio decrease and turns negative part way through the drive range. The transition from the first forward drive range to the second forward range may occur at a hydrostatic ratio inflection point (e.g., a maximum hydrostatic ratio). Further, a shift window 502 from tr2 to tr3 involves inverting the hydrostatic ratio, thereby reverting motor speed. A third forward drive range occurs from t3 to t4 where the hydrostatic ratio is decreased.

The shift events between the second reverse drive range and the first reverse drive range as well as between the first forward drive range and the second forward drive range occurs synchronously where the hydrostatic ratio reaches a maximum negative value or maximum positive value, respectively and begins to increase and decrease. During these synchronous shift events at the inflection of the hydrostatic ratio, one clutch may be fully engaged while the other clutch is fully disengaged.

The shift event between the second forward drive range and the third forward drive range occur asynchronously. The specific phases in this asynchronous shift event are expanded upon herein with regard to FIGS. 6-9.

Figure 6:
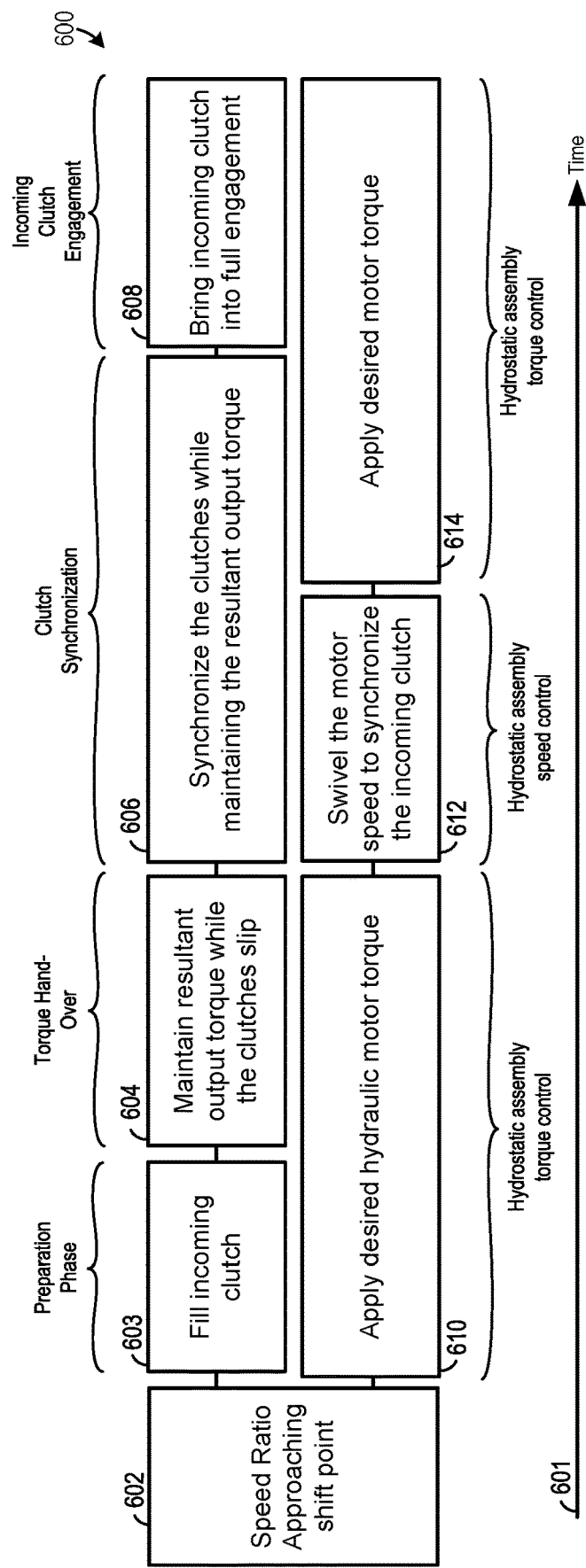
FIG. 6 shows a method for performing an asynchronous shift in a hydromechanical transmission system.

FIG. 6 shows a method 600 for operation of a hydrostatic assembly and a gearbox in a transmission. The method 600 may be carried out by any of the transmission systems described above with regard to FIGS. 1-3B or a combination of the transmission systems. However, in other embodiments the method shown in diagram 500 may be implemented via other suitable transmission systems.

Time is indicated on axis 601 and increases from left to right. Further, steps 603-608 are implemented in the gearbox (e.g., the multi-speed gearbox 107 depicted in FIG. 1A) while steps 610-614 are implemented via the hydrostatic assembly (e.g., the hydrostatic assembly 109 depicted in FIG. 1A). As such, steps carried out of the gearbox and the hydrostatic assembly may be implemented at overlapping times. To elaborate, these steps may be conceptually divided into multiple phases. The phases in the gearbox may sequentially include a preparation phase, a torque hand-over phase, a clutch synchronization phase, and an incoming clutch engagement phase. On the other hand, the phases in the hydrostatic assembly may sequentially include a first torque control phase, a speed control phase, and a second torque control phase. The speed control phase may be referred to as a swiveling phase, expanded upon herein.

At 602, the system approaches a shift point speed ratio. The shift point speed ratio may be a value (e.g., a predetermined value) that is determined based on the gearing in the gearbox and the configuration of the hydrostatic assembly, for instance. In one use-case example, the shift point ratio may be in the range between 0.5 and 1.5. However, numerous shift point ratios are possible.

At 603, the method includes filling an incoming clutch in preparation of a shifting transient. For instance, a hydraulic piston in the incoming clutch may be filled with oil and pressurized to a kiss point value. The kiss point value is a value when the clutch begins to transmit torque. Step 603 may therefore be referred to as the preparation phase. The preparation phase may start when the speed ratio enters or approaches the shifting window and end when the incoming clutch is fully filled with hydraulic fluid (e.g., oil) and the clutch position has reached the end of its stroke.

Next at 604, the method includes maintaining a resultant output torque while the clutches involved in the shifting event slip. As such, at step 604 one clutch may increase engagement while the other clutch decreases engagement. In other words, the clutches are controlled to hand over torque and at the end of this phase the outgoing clutch is discharging.

Next at 606, the method includes synchronizing the clutches and maintaining the resultant output torque during clutch synchronization. For instance, the piston pressure in incoming clutch may be increased while the piston pressure in the outgoing clutch may be decreased. Further, this pressure increase and decrease may be proportional to maintain the transmission output torque around a target set-point or within a target set-point range.

Next at step 608, the method includes brining the incoming clutch into full engagement. For instance, the piston pressure in the incoming clutch may reach an upper threshold value indicative of full engagement where slipping of the clutch ceases to occur.

In the hydrostatic assembly, the method includes at 610, applying a desired hydraulic motor torque at the hydrostatic assembly's output. For instance, the hydraulic motor torque may be adjusted to follow a hydrostatic assembly torque set-point. As such, the hydrostatic assembly may be torque controlled during the preparation phase. Next at 612, the method includes swiveling the motor speed to synchronize the incoming clutch. Next at 614, the method includes applying a desired motor torque.

It will be understood, that step 612 may overlap with step 606. In this way, the hydrostatic assembly's speed may be inverted while a desired transmission output torque is maintained, thereby enhancing shifting performance. Further, the step 612 may be referred to as a swiveling phase that is expanded upon herein.

Figure 7:
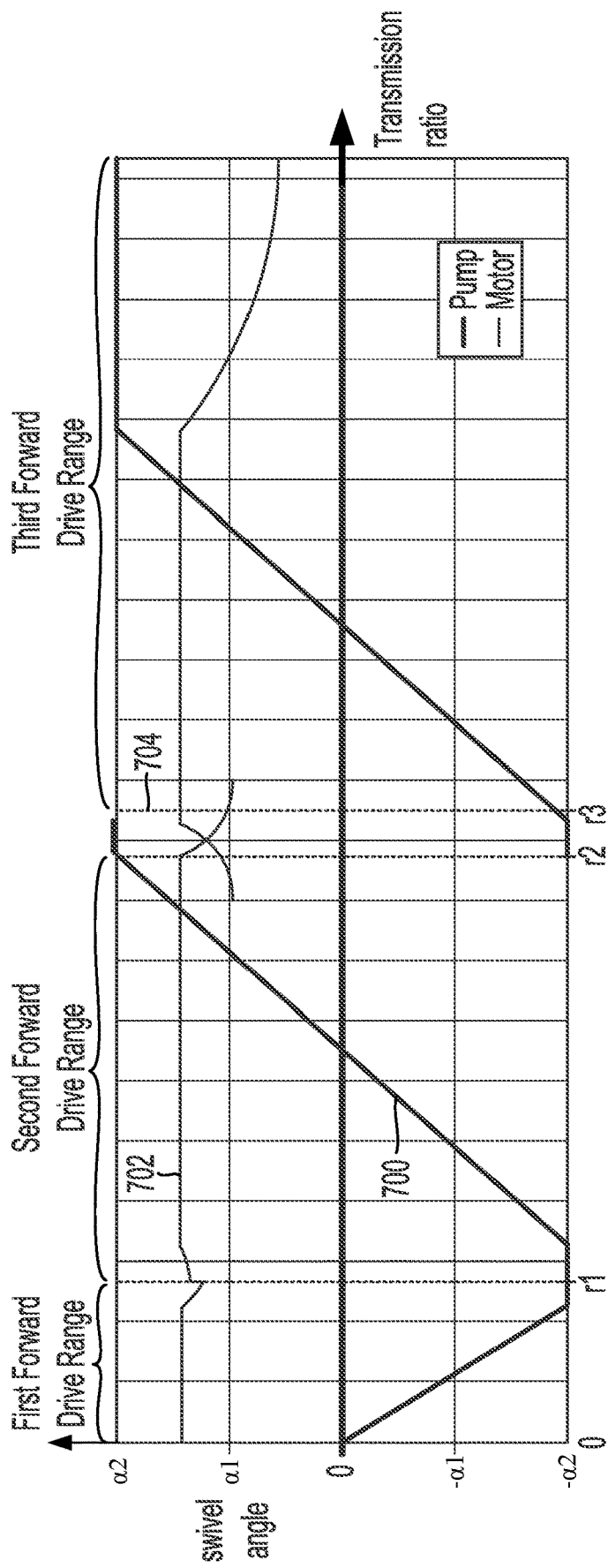
FIG. 7 shows a swivel angle diagram for the hydraulic pump and the hydraulic motor in a hydromechanical transmission system.

FIG. 7 shows prophetic exemplary graphical depictions of a normalized swivel angle of the hydraulic pump and the hydraulic motor in the hydrostatic assembly vs. transmission ratio. Although specific numerical values are not provided in FIG. 7, points above the abscissa represent positive swivel angles, points below the abscissa represent negative swivel angles, and transmission ratio increases from left to right.

Specifically, plot 700 is associated with the hydraulic motor and plot 702 is associated with the hydraulic pump. Further, a portion of the transmission's drive ranges (the first drive range through the third drive range) are demarcated along the abscissa. The hydraulic pump and motor as well as other transmission components referenced with regard to FIG. 7 as well as the other graphs described herein may correspond to the hydraulic motors, pumps, and components described with regard to FIGS. 1-3B.

From 0 to r1 the pump's swivel angel decreases along with the motor's swivel angle. At r1 a synchronous shift is performed.

The synchronous shift may be triggered at a hydrostatic ratio inflection point. The hydrostatic assembly's power flow direction is commanded to invert as consequence of the shift, synchronously with a clutch hand-over via controlling the hydrostatic assembly in torque control mode. It will be understood that a clutch hand-over includes bringing one clutch into engagement while disengaging another clutch. To elaborate, during the synchronous shift the pump's swivel angle reaches a minimum value (e.g., −α2). The hydraulic pump's swivel angle at the synchronous shift may be a dynamic value, and may depend on the variable displacement hydraulic motor angle and on volumetric efficiency (e.g., the magnitude of torque delivered by the hydrostatic motor). The pump's swivel angle may not be actively controlled but is a consequence of the load, since the hydrostatic may be torque controlled in the synchronous shift phase. During the synchronous shift, the hydrostatic assembly changes the high-pressure side, meaning that the power flow direction inverters: from a pump-to-motor direction to a motor-to-pump direction or vice versa. As such, at r1 the high pressure side of the hydrostatic assembly may switch from a push condition to a pull condition.

From r1 to r2 the pump's swivel angel increases and the motor's swivel angle remains relatively constant. Specifically, at r2 the pump's swivel angle reaches a maximum value (e.g., α2).

The shifting window corresponding to the transition between the second forward drive range and the third forward drive range is indicated at 704. In the shift window, from r2 to r3, the pump's swivel angle is inverted. Consequently, the motor's speed and more generally the hydrostatic assembly's speed is reversed. During the speed reversal, the motor's swivel angle is decreased and then increased while its speed is reverted. As previously discussed with regard to FIG. 6, the motor speed is reverted while the clutches involved in the shift are slipping where one clutch is engaged while the other is disengaged. The motor speed inversion results in synchronization of the incoming clutch. In this way, the transmission can efficiently transition between the second forward drive range and the third forward drive range with little or no power interruption.

Figure 8A:
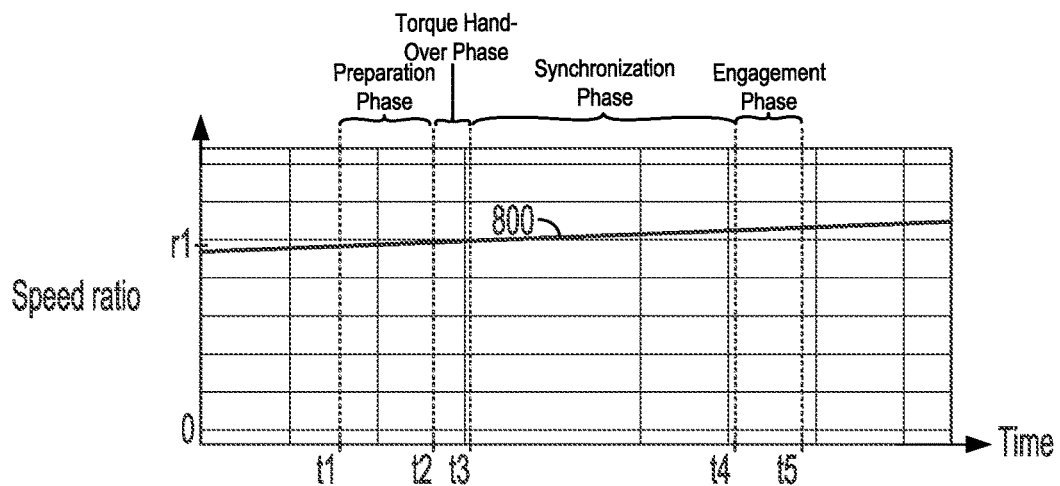
FIGS. 8A-8D show graphical depictions of transmission speed ratio, motor speed, differential pressure, and clutch pressure that occur during an asynchronously shift event.
Figure 8B:
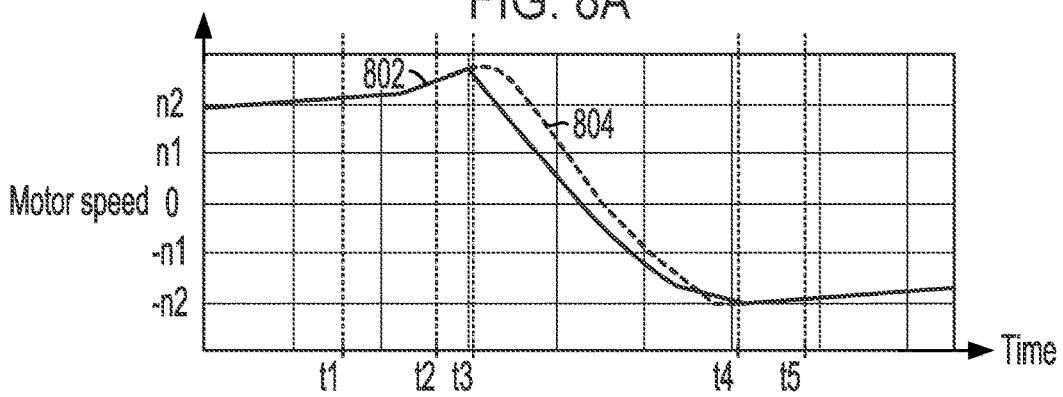
Figure 8C:
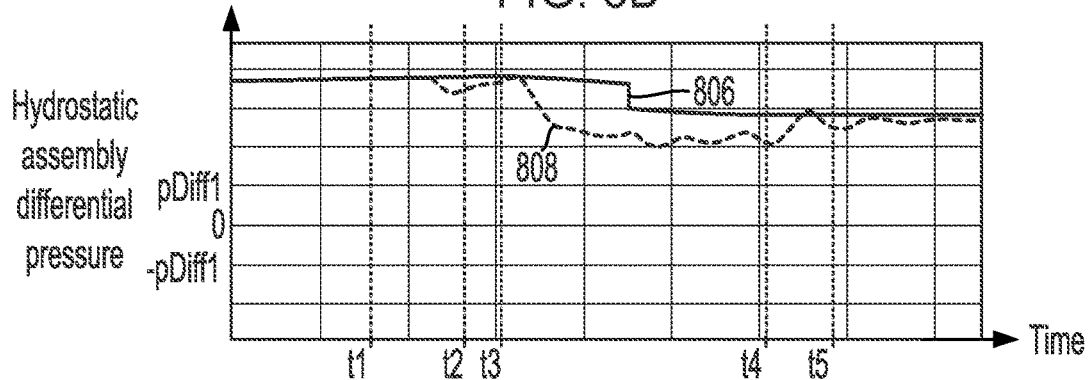
Figure 8D:
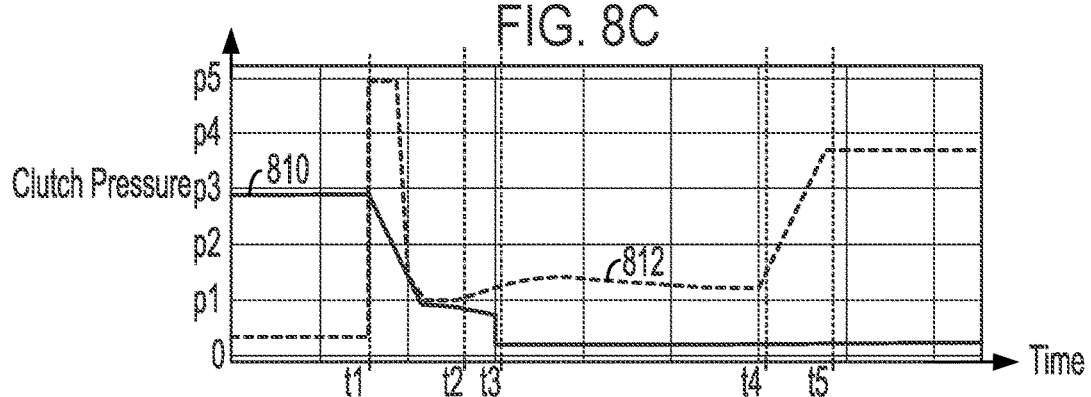

FIGS. 8A-8D show prophetic graphical depictions of different variables during an exemplary asynchronous shift event. The phases (preparation phase, torque hand-over phase, synchronization phase, and the engagement phase) of the asynchronous shift event are demarcated on the abscissa. The preparation phase occurs from t1 to t2, the torque hand-over phase occurs from t2 to t3, the synchronization phase occurs from t3 to t4, and the engagement phase occurs from t4 to t5. FIG. 8A shows a plot 800 of the transmission speed ratio vs. time. The speed ratio of the transmission may be measured from the input and output shafts. FIG. 8B, shows a plot 802 of a desired motor speed vs. time and a plot 804 of the actual motor speed vs. time. FIG. 8C shows a plot 806 of a desired differential pressure of the hydrostatic assembly vs. time and a plot 808 of the actual hydrostatic assembly differential pressure vs. time. FIG. 8D shows a plot 810 of a desired clutch pressure vs. time for the second forward drive clutch and a plot 812 of a desired clutch pressure vs. time for the third forward drive clutch. In each graph, time increases from left to right, although specific numerical values are not provided.

From t1 to t2, the preparation phase occurs and the hydrostatic assembly follows a motor torque set-point. Specifically, at t1, the transmission speed ratio reaches a desired shift point ratio (r1) (e.g., a shifting threshold ratio). Responsive to the ratio reaching or approaching the shift point ratio, the pressure supplied to the incoming clutch (e.g., the third forward drive clutch) is increased to fill the clutch's pressure piston in preparation of a clutch hand-off. The filling of the incoming clutch may have a parabolic shape, although other clutch filling strategies may be used. Further, during the preparation phase pressure supplied to the outgoing clutch (e.g., the second drive range clutch) is decreased. To elaborate, the pressure supplied to the outgoing clutch may be ramped down to a torque target within a desired amount (e.g., 70%) of the last preparation time of the incoming clutch. After, the outgoing clutch is ramped down to a desired level, the pressure may be held at that level unit, and the filling of the incoming clutch ends.

At t2, the torque control phase begins and lasts until t3. In this phase, the hydrostatic assembly follows a motor torque set-point. The torque control phase may specifically begin when the preparation phase ends and end at a predetermined time after it begins. For instance, the torque phase may last for 100 milliseconds (ms), in one use-case example. However, numerous suitable torque phase durations have been contemplated. Further, during the torque control phase, the incoming clutch may reach its torque target via a ramped progression. Conversely, during the torque control phase, the outgoing clutch follows a torque set-point. In particular, the outgoing clutch torque set-point may be null to allow the clutch to be discharged.

Figure 9:
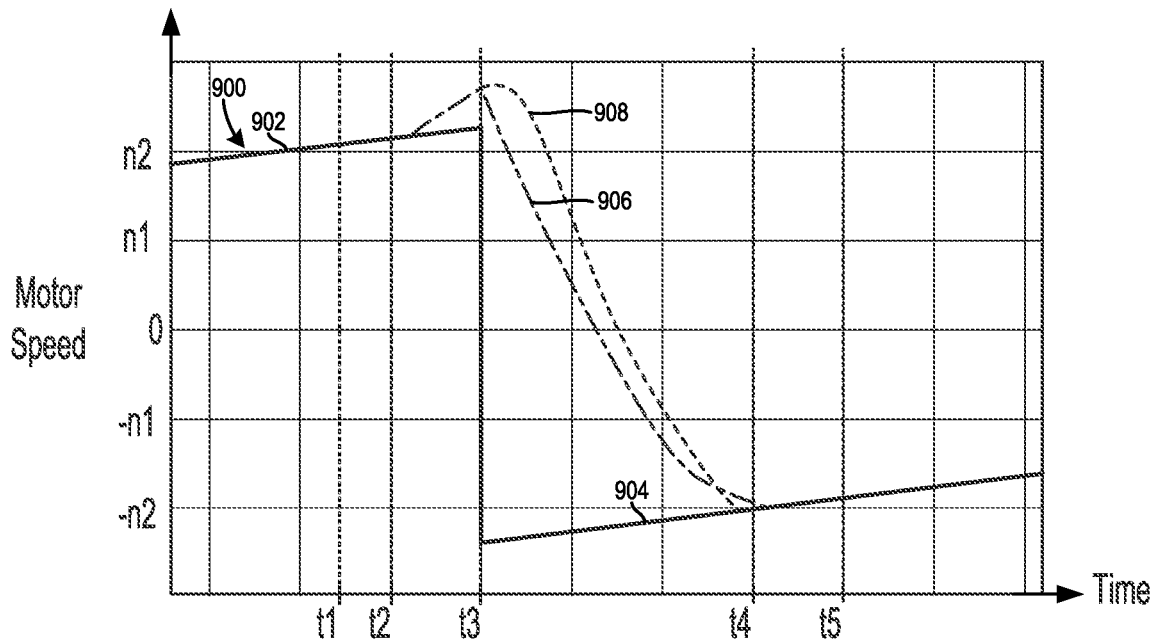
FIG. 9 shows a detailed graphical depiction of motor speed targets and set-points that occur during an asynchronous shift event in a hydromechanical transmission.

The synchronization phase occurs from t3 to t4. A swiveling phase makes up a portion of the synchronization phase. It will be appreciated, that the swiveling phase may start with the synchronization phase. The swiveling phase may be defined as the portion of the synchronization phase where the hydrostatic assembly is speed controlled. FIG. 9 shows a graphical depiction of various motor speed targets and set-points that are used during the swiveling phase. Specifically, plot 900 indicates a target motor speed. Section 902 of the plot 900 corresponds to the target motor speed during the second forward drive range and section 904 of the plot 900 corresponds to the target motor speed during the third forward drive range. Time is indicated on the abscissa and increases from left to right. Plot 906 corresponds to a rate limited motor speed set-point and plot 908 is the actual motor speed (similar to plot 804 shown in FIG. 8B).

The second forward drive range motor speed target (plot section 902) may be the motor speed demanded to verity kinematic constraints (related to the transmission's mechanical design) with the actual transmission input and output shaft speeds, and the second forward drive range gear engaged.

Similarly, the third forward drive range motor speed target (plot section 904) may be the motor speed demanded to verify kinematic constraints (related to the transmission's mechanical design) with the actual transmission input and output shaft speeds, and the third forward drive range gear engaged.

Further, the motor speed set-point 906 and the motor speed target 900 may control the motor set-point gradient to avoid steps in the motor speed reference. In this way, a smooth shift is achieved.

The swiveling phase may end when the rate limited motor speed set-point 906 achieving the motor speed target 900 and when the error between the motor speed set-point and the actual motor speed is close to null. The swiveling phase allows the incoming clutch to be efficiently synchronized with the outgoing clutch, thereby reducing the chance (e.g., substantially avoiding) torque interruption during the asynchronous shift. Consequently, shifting performance is increased. It will be understood the synchronization phase may persist after the swiveling phase ends.

Returning to FIGS. 8A-8D, the engagement phase occurs from t4 to t5. As such the engagement phase starts when the synchronization phase ends and the engagement phase ends when the incoming clutch (e.g., the third drive range clutch) reaches a desired engagement level (e.g., full engagement). As such, during the engagement phase the incoming clutch may follow a torque set-point and the outgoing clutch is discharged. Additionally, during the engagement phase, the hydrostatic assembly reverts to following a motor torque set-point. In this way, the asynchronous shift may quickly and smoothly occur while permitting substantially constant torque transfer through the driveline to the achieved, if wanted. Driveline performance is consequently increased.

The technical effect of the hydromechanical transmissions and transmission operating methods described herein is to provide a targeted group of drive ranges in an energy and space efficient package. Further, the transmission systems and methods described herein allow the transmission achieve a desired amount of drive ranges that suit end use design targets. Further, the transitions between these ranges occur with a decreased amount (e.g., substantially zero) power interruption, thereby decreasing NVH during mode shifting transients and further increasing transmission energy efficiency.

FIGS. 1-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a transmission system is provided that comprises a hydrostatic assembly including a variable displacement hydraulic pump and a hydraulic motor; a planetary gearset coupled to a multi-speed gearbox, a hydraulic motor, and an output shaft via separate gears and/or shafts; wherein the variable displacement hydraulic pump is coupled to an input of the multi-speed gearbox; wherein the multi-speed gearbox includes one or more clutches and is coupled to a prime mover; and wherein the output shaft is designed to couple to an axle.

In another aspect, a hydromechanical variable transmission is provide that comprises a hydrostatic assembly including a variable displacement hydraulic pump and a variable displacement hydraulic motor; a planetary gearset coupled to a multi-speed gearbox, the variable displacement hydraulic motor, and an output shaft via separate gears and/or shafts; wherein the variable displacement hydraulic pump is coupled to an input of the multi-speed gearbox; wherein the multi-speed gearbox is coupled to an internal combustion engine and includes a plurality of friction clutches coupled to a gear in the planetary gearset; and wherein the output shaft is designed to couple to an axle.

In yet another aspect, a method for operating a transmission system is provided that comprises asynchronously shifting between a first pair of drive ranges in the transmission system via operation of two clutches and a variable displacement hydraulic pump in a hydrostatic assembly; wherein asynchronously shifting between the first pair of drive ranges includes a plurality of phases that include a swiveling phase where a speed of the hydrostatic assembly is inverted. The method may further include, in one example, synchronously shifting between a second pair of drive ranges.

In another aspect, a transmission system is provided that comprises a hydrostatic assembly including a hydraulic pump and a hydraulic motor; a planetary gearset coupled to a gearbox, a hydrostatic assembly, and an output shaft via separate gears and/or shafts; a controller including instructions that when executed during, a shifting event, cause the controller to: asynchronously shift between a first pair of drive ranges via operation of two clutches in the gearbox and the hydrostatic assembly.

In another aspect, a method for operating a hydromechanical variable transmission is provided that comprises asynchronously shifting between a first pair of forward drive ranges in the hydromechanical variable transmission via operation of two clutches and a hydrostatic assembly while maintaining a uni-directional power flow through the hydromechanical variable transmission; wherein asynchronously shifting between the first pair of forward drive ranges includes inverting a speed of the hydrostatic assembly via controlling the hydrostatic assembly based on a motor speed set-point. The method may further include, in one example, synchronously shifting between a second pair of drive ranges at a hydrostatic ratio inflection point.

In any of the aspects or combinations of the aspects, the second pair of drive ranges may include reverse drive ranges and/or forward drive ranges.

In any of the aspects or combinations of the aspects, the first pair of drive ranges may be forward drive ranges.

In any of the aspects or combinations of the aspects, in the swiveling phase the hydrostatic assembly may be speed controlled such that the variable displacement hydraulic pump is controlled based on a speed set-point of a hydraulic motor in the hydrostatic assembly.

In any of the aspects or combinations of the aspects, the plurality of phases may include an engagement phase that is subsequent to the swiveling phase and during the engagement phase the hydrostatic assembly is torque controlled such that the variable displacement hydraulic pump is controlled based on a torque set-point of the hydraulic motor.

In any of the aspects or combinations of the aspects, during the engagement phase, a first clutch in the two clutches may be controlled based on a torque set-point and a second clutch in the two clutches is disengaged.

In any of the aspects or combinations of the aspects, asynchronously shifting between the first pair of drive ranges may include, during the swiveling phase, controlling the hydrostatic assembly via a rate limited motor set-point and wherein the rate limited motor set-point is determined based upon an error calculated based on a motor speed set-point and a motor speed target.

In any of the aspects or combinations of the aspects, asynchronously shifting between the first pair of drive ranges may include transitioning from the swiveling phase to an engagement phase and wherein the transition from the swiveling phase to the engagement phase is initiated in response to the rate limited motor set-point reaching a motor speed target.

In any of the aspects or combinations of the aspects, asynchronously shifting between the first pair of drive ranges may include, during a torque control phase, synchronously engaging a first clutch two clutches while disengaging a second clutch in two clutches while maintaining a constant output torque of the transmission system.

In any of the aspects or combinations of the aspects, asynchronously shifting between the first pair of drive ranges may include a swiveling phase where the hydrostatic assembly is controlled to follow a motor speed set-point and invert the speed of the hydrostatic assembly.

In any of the aspects or combinations of the aspects, the controller may further comprise instructions that when executed, during the swiveling phase, cause the controller to rate limit the motor speed set-point based on an error between the motor speed set-point and a motor speed target.

In any of the aspects or combinations of the aspects, asynchronously shifting between the first pair of drive ranges may include a torque control phase, prior to the swiveling phase, wherein the hydrostatic assembly is controlled to follow a motor torque set-point.

In any of the aspects or combinations of the aspects, the controller may further comprise instructions that when executed, during the torque control phase, cause the controller to engage a first clutch in the two clutches while disengaging a second clutch while maintaining a constant output torque in the transmission system.

In any of the aspects or combinations of the aspects, the two clutches may be forward drive clutches and one of the two clutches may be positioned coaxial to a reverse drive clutch.

In any of the aspects or combinations of the aspects, the two clutches may be wet friction clutches.

In any of the aspects or combinations of the aspects, asynchronously shifting between the first pair of forward drive ranges may include subsequent to inverting the speed of the hydrostatic assembly.

In any of the aspects or combinations of the aspects, the transmission system may be designed with at least two reverse drive ranges and at least three forward drive ranges.

In any of the aspects or combinations of the aspects, the one or more clutches may be friction clutches.

In any of the aspects or combinations of the aspects, the multi-speed gearbox may be designed to powershift between at least two of the drive ranges.

In any of the aspects or combinations of the aspects, a sun gear in the planetary gearset may be coupled to the hydraulic motor.

In any of the aspects or combinations of the aspects, a ring gear in the planetary gearset may be coupled to the multi-speed gearbox.

In any of the aspects or combinations of the aspects, a carrier in the planetary gearset may be coupled to the output shaft.

In any of the aspects or combinations of the aspects, the planetary gearset may be a simple planetary gearset.

In any of the aspects or combinations of the aspects, two clutches in the multi-speed gearbox may be positioned coaxial to one another.

In any of the aspects or combinations of the aspects, the transmission system may be an infinitely variable transmission.

In any of the aspects or combinations of the aspects, the prime mover may be an internal combustion engine.

In any of the aspects or combinations of the aspects, the system may further comprise one or more mechanical power-take offs (PTOs) coupled to one or more of the variable displacement hydraulic pump and a clutch in the multi-speed gearbox.

In any of the aspects or combinations of the aspects, the planetary gearset may include: a sun gear coupled to the variable displacement hydraulic motor; a ring gear coupled to the multi-speed gearbox; and a carrier coupled to the output shaft.

In any of the aspects or combinations of the aspects, the hydromechanical variable transmission may be designed with at least two reverse drive ranges and at least three forward drive ranges; and the multi-speed gearbox may be designed to powershift between at least two of the drive ranges.

In any of the aspects or combinations of the aspects, two of the plurality of friction clutches may be positioned coaxial to one another and the other clutches in the plurality of friction clutches are spaced away from the two coaxial friction clutches.

In any of the aspects or combinations of the aspects, the plurality of friction clutches may be controlled via a plurality of hydraulic pistons.

In any of the aspects or combinations of the aspects, the plurality of friction clutches may be coupled to the planetary gearset via different mechanical gains.

In any of the aspects or combinations of the aspects, the gear in the planetary gearset may be a ring gear.

In any of the aspects or combinations of the aspects, the transmission may further comprise a charging pump and a mechanical power take-off (PTO) coupled to the variable displacement hydraulic pump.

In another representation, a hydromechanical variable transmission is provided that includes a gearbox with an asymmetric number of forward and rear friction clutches and a hydrostatic unit coupled in parallel via a planetary assembly and a controller configured to shift between two drive ranges via inversion of a hydraulic ratio of a hydrostatic unit.

In another representation, a method for operation of a hydromechanical variable transmission is provided, that includes during a first shift event swiveling a hydraulic pump in a hydraulic unit to revert the speed of a hydraulic motor to synchronize an incoming clutch with an outgoing clutch and during a second shift event performing a torque hand-off between a pair of clutches while a hydraulic ratio of the hydraulic unit is maintained substantially constant.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the terms "substantially" may be construed to mean plus or minus three percent of the range, unless otherwise specified.

The invention claimed is:

1. A transmission system, comprising:
a hydrostatic assembly including a variable displacement hydraulic pump and a hydraulic motor; and
a planetary gearset mechanically coupled to a first shaft and mechanically coupled to an output shaft via a first gear;
an input shaft coupled to a second gear that is mechanically coupled to a second shaft via the second gear that meshes with a third gear;
wherein the third gear is mechanically coupled to the second shaft;
wherein the variable displacement hydraulic pump is selectively mechanically coupled to the second shaft via a first clutch that is positioned coaxial to the input shaft;
wherein the input shaft is mechanically coupled to a prime mover; and
wherein the output shaft is:
mechanically coupled to an axle; and
selectively coupled to the hydraulic motor via a second clutch that is positioned coaxial to the output shaft;
a third clutch that is positioned coaxial to the first clutch; and
a fourth clutch positioned coaxial to the second shaft and selectively mechanically coupling the input shaft to the second shaft via a fourth gear.

2. The transmission system of claim 1, wherein [third] a seventh gear meshes with a fifth gear and wherein the fifth sear is mechanically coupled to a ring gear in the planetary gearset.

3. The transmission system of claim 2, wherein the first clutch is a friction clutch.

4. The transmission system of claim 3, wherein the transmission system has an asymmetric number of forward and rear drive ranges.

5. The transmission system of claim 1, wherein a sun gear in the planetary gearset is mechanically coupled to the hydraulic motor.

6. The transmission system of claim 5, wherein [the third] a seventh gear meshes with a fifth gear and wherein the fifth sear is mechanically coupled to a ring gear in the planetary gearset.

7. The transmission system of claim 6, wherein a carrier in the planetary gearset is mechanically coupled to an eighth gear, wherein the eighth gear meshes with a sixth gear, and wherein the sixth sear is mechanically coupled to the output shaft.

8. The transmission system of claim 1, wherein the planetary gearset is a simple planetary gearset.

9. The transmission system of claim 1, wherein the transmission system is an infinitely variable transmission.

10. The transmission system of claim 1, wherein the prime mover is an internal combustion engine.

11. The transmission system of claim 1, further comprising a mechanical power-take off (PTO) mechanically coupled to the first clutch.

12. A hydromechanical variable transmission, comprising: a hydrostatic assembly including a variable displacement hydraulic pump and a variable displacement hydraulic motor; wherein the variable displacement hydraulic pump is mechanically coupled to a first clutch via a first gear that is positioned coaxial to an input shaft; a carrier included in planetary gearset mechanically coupled to an output shaft; a third clutch positioned coaxial to the first clutch, wherein the first clutch is a forward drive clutch and the third clutch is a reverse clutch; and a fourth clutch positioned coaxial to a second shaft and selectively mechanically coupling the input shaft to the second shaft via a second gear; wherein the input shaft is mechanically coupled to a prime mover; wherein the input shaft includes the first clutch positioned coaxial thereto and configured to selectively mechanically couple the variable displacement hydraulic pump to [a] the second shaft; wherein the output shaft is designed to couple to an axle; and wherein the output shaft is selectively coupled to the variable displacement hydraulic motor via a second clutch that is positioned coaxial to the output shaft.

13. The hydromechanical variable transmission of claim 12, wherein the planetary gearset is a simple planetary gearset that includes:
 a sun gear mechanically coupled to the variable displacement hydraulic motor;
 a ring gear; and
 the carrier.

14. The hydromechanical variable transmission of claim 12, wherein:
 the hydromechanical variable transmission is designed with at least two reverse drive ranges and at least three forward drive ranges.

15. The hydromechanical variable transmission of claim 12, wherein the first clutch is controlled via a hydraulic piston.

16. The hydromechanical variable transmission of claim 12, wherein the hydromechanical variable transmission has a greater number of forward drive ranges than reverse drive ranges.

17. The hydromechanical variable transmission of claim 12, further comprising a charging pump and a mechanical power take-off (PTO) mechanically coupled to the variable displacement hydraulic pump.

* * * * *